# United States
Schaefer

[11] 3,743,385
[45] July 3, 1973

[54] FRESNEL ASPHERIC LENS
[75] Inventor: Howard A. Schaefer, Lancaster, Ohio
[73] Assignee: Anchor Hocking Corporation, Lancaster, Ohio
[22] Filed: Sept. 25, 1972
[21] Appl. No.: 291,759

Related U.S. Application Data
[63] Continuation of Ser. No. 36,880, May 13, 1970, abandoned, which is a continuation-in-part of Ser. No. 25,179, April 2, 1970, Pat. No. 3,708,221.

[52] U.S. Cl.............. 350/189, 240/106.1, 350/211
[51] Int. Cl......... G02b 3/04, G02b 3/08, F21r 5/04
[58] Field of Search..................... 350/178, 189, 190, 350/191, 192, 211; 240/106.1

[56] References Cited
UNITED STATES PATENTS
1,955,599   4/1934   Lamblin-Parent............... 240/106.1

Primary Examiner—Ronald L. Wibert
Assistant Examiner—Paul A. Sacher
Attorney—Arthur G. Connolly et al.

[57] ABSTRACT

An aspheric lens is made with a fresnel type aspheric curvature on at least a portion of its back surface and with the aspheric curvature being defined in the X-Y coordiante system by a particular relationship in accordance with the index of refraction, heighth, focal distance and radius of back surface parameters.

9 Claims, 12 Drawing Figures

FRESNEL ASPHERIC LENS

CROSS-REFERENCE TO RELATED APPLICATION

This application is a continuation of application Ser. No. 36,880, filed May 13, 1970, and now abandoned which in turn is a continuation-in-part of copending application Ser. No. 25,179; filed Apr. 2, 1970 now U.S. Pat. No. 3,708,221.

BACKGROUND OF INVENTION

Aspheric lenses have been utilized in the prior art for various purposes. As pointed out in the parent application a difficulty with the prior art lenses has been in the accurate forming of the aspheric curvature. The parent application disclosed a means which represented a significant breakthrough in attaining a high degree of accuracy and control over the specific aspheric curvature and which has lent itself to mass producing high quality products.

The disclosure of the parent application was primarily directed to a wide variety of aspheric lenses wherein the aspheric curvature was formed on the frontal surface. Although the lenses were intended for a large number of different uses there was particular utility in the application of these lenses in motor vehicle systems.

SUMMARY OF INVENTION

An object of this invention is to provide an aspheric lens which utilizes the concepts of the parent application to obtain even greater versatility thereof.

A further object of this invention is to provide such an aspheric lens which has particular utilization in a vehicle headlight system to minimize glare to the oncoming driver.

A still further object of this invention is to provide a modified aspheric lens which has applicability for producing the intended concentrated parallel rays of light regardless of the environment of the lens.

A still further object of this invention is to provide a lens of the type which is equally effective in air or under water.

In accordance with one aspect of this invention an aspheric lens of the type described in the parent application is provided wherein an aspheric curvature is created on the frontal surface to create the concentrated rays of light having minimal chromatic aberrations and wherein the back surface includes parallel spherical segmental flutes to create auxiliary spread light and also includes fresnel-type flutes to prevent the spread light from being directed into the eyes of the oncoming driver. The fresnel-type flutes are in the form of an aspheric curvature.

In accordance with another aspect of this invention the lens is formed with a planar frontal surface and with a fresnel-type aspheric curvature on the back surface. This lens creates a concentrated light beam of parallel rays having minimal chromatic aberrations regardless of the environment of the lens and is thus equally useful in water, air and other environments.

As is apparent hereinafter the aspheric curvature is a smooth curve of constantly changing radius with the point constantly recalculated in accordance with certain parameters to uniformly distribute the light, in contrast to an aspheric hyperboloid which concentrates the light axially.

THE DRAWINGS

DETAILED DESCRIPTION

To appreciate an understanding of the development of this invention reference made to the techniques described in parent application Ser. No. 25,179; filed Apr. 2, 1970, the details of which are incorporated herein by reference thereto.

Figure 1:
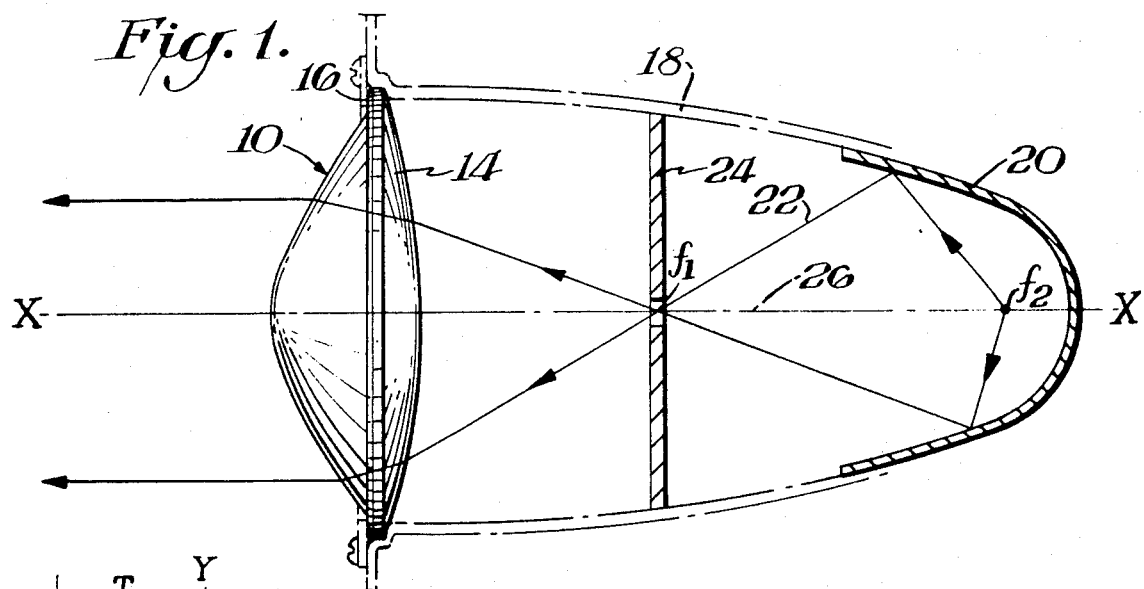
FIG. 1 is a side elevation view of a convexo-aspheric lens of the type described in the parent application and schematically incorporated in a vehicle headlight system.

As described in the parent application the basic concept of the novel aspheric curvature begins with a lens 10 having an aspheric frontal curvature 12 and a convex back surface 14 which is in the segment of a sphere. A peripheral rim 16 adapts the lens 10 to be mounted in a vehicle headlight system which may include for example a housing 18 having any suitable point source of light which may be simulated by utilizing light source $f_2$ and an elipitical reflector 20 to refocus the light rays 22 to infinity with minimum chromatic aberration. As schematically illustrated in FIG. 1 lens 10 closes the open end of the housing 18. Housing 18 also includes an aperture plate 24 having its aperture at the focal point $f_1$ with lens 10 being symetrically arranged on the optical axis 26 of the headlight system. The paths of light passing through lens 10 are parallel to the optical axis 26 to an unusually high degree of accuracy thereby producing a highly concentrated light beam which is particularly effective for lighting a roadway. The housing 18 and its various components are connected in the headlight system as an auxiliary light or as a replacement for either the conventional high or low beams. Any suitable glass composition such as a borosilicate glass may be utilized with this invention while still attaining the high degree of accuracy. It is to be understood, of course, that although the lens 10 is described with particular reference to use in a vehicle other uses are also possible within the scope of this invention where there is a requirement for a concentrated light beam having minimal chromatic aberration and wherein the paths in the light beam are parallel to the optical axis.

As described in the parent application, frontal surface 12 is formed with an aspheric curvature which may be accurately reproduced and controlled through a series of mathematical calculations which particularly lend themselves to the use of computer techniques thereby vastly reducing the time and labor requirements. The formulas used for determining the aspheric curvature are particularly noteworthy in that the many parameters can be varied while still producing a highly accurate relatively low cost mass produced lens with very good light control properties. The parameters which can be varied in accordance with this invention are the radius of back curve, the focal distance to the face of the back curve, the refractive index of the glass, the diameter of the lens and the thickness of the lens.

Figure 2:
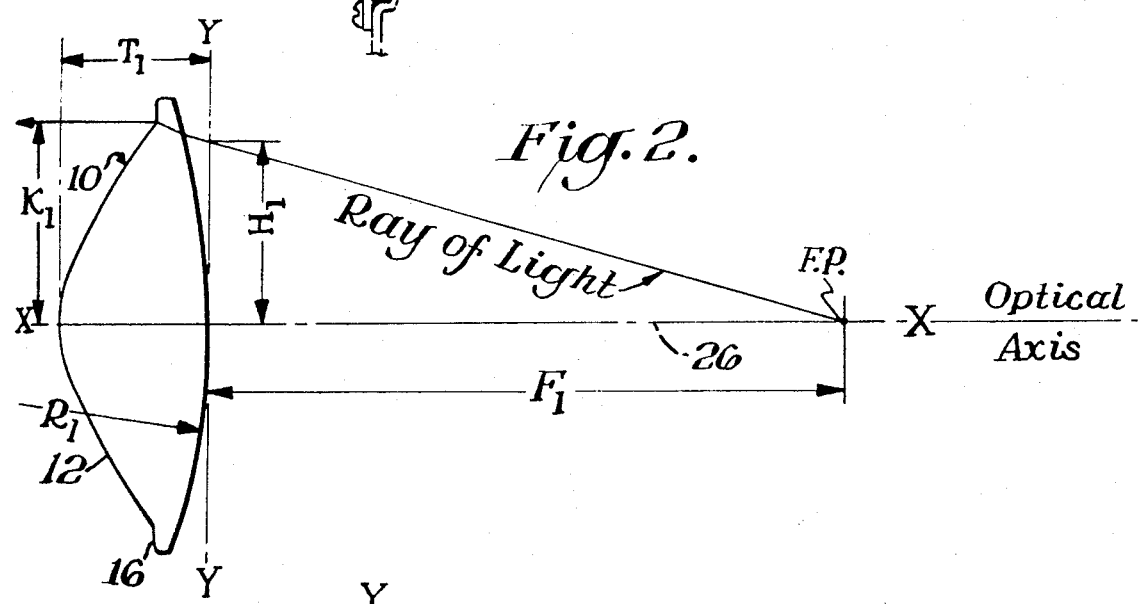
FIG. 2 is a schematic showing of the various parameters utilized in determining the specific aspheric curvature.

FIG. 2 schematically illustrated the various parameters which must be considered in forming the lens 10 and which are taken into account in accurately producing and reproducing the aspheric curvature on the frontal surface 12. As is readily apparent in FIG. 2 the aspheric curvature is a smooth curve with constantly changing radius. As indicated in FIG. 2 the focal point FP lies upon the optical axis 26. This axis is also designated as the X—X axis of the X-Y coordinate system. Where the optical axis intersects the face of the back curve of the convex back surface and tangent thereto is the Y—Y axis of the X-Y coordinate system. The heighth of the ray of light is indicated as $H_1$ and corresponds to the Y distance at which the ray of light intersects the Y axis. The various points on the aspheric frontal surface 12 each have a corresponding X and Y value in accordance with the X-Y coordinate system. As later used in the formulas for defining this curvature these X and Y values are indicated as $X_1$ and $Y_1$ which represents the variable X and Y coordinates. The maximum thickness of the lens is illustrated in FIG. 2 as $T_1$ while $F_1$ represents the focal distance of the focal point FP to the back surface of the lens. $K_1$ designates the limit of active surface. It is not necessary to continue the aspheric curvature beyond $K_1$ and thus the remaining portion 16 of the frontal surface may be used for mounting the lens 10 in any suitable housing. The lower computer limit of the X value of $K_1$ is indicated as $L_1$ while the upper limit is designated as $L_2$. The radius of the convex back surface is designated as $R_1$.

The various points on the aspheric curvature are defined in the X-Y coordinate system by the variable $B_1$ being equal to $\{X_1[COT(A_6) +Y_1-J_1 + D_1[TAN(A_4)]\} / [TAN(A_4) + COT(A_6)]$ and the corresponding $C_1$ being equal to $J_1 + (B_1-D_1) [TAN(A_4)]$. These formulas represent a shorthand method of computing the aspheric curvature and the designations therein are derived from the following mathematical calculations wherein $N_1$ is the index of refraction and other parameters have their designations in FIG. 2; $B_1$ is the X value of the point being calculated and $C_1$ is its corresponding Y value; and wherein $X_1$ is the X value of the previous calculated point, while $Y_1$ is the Y value of the previous calculated point and wherein: $G_1 = 4(2 R_1F_1 + F_1^2)$; $A_1 = ATN (H_a/F_1)$; $E_1 = 2(R_1+F_1) \cdot [COS(A_1)]$; $E_2 = E_1^2 - G_1$; $M_5 = (E_1 - \sqrt{E_2}) \cdot (0.5)$; $J_1 = M_5[SIN(A_1)]$; $D_1 = (J_1-H_1) \cdot [TAN(A_1)]$; $A_2 = ASN (J_1/R_1)$; $A_7 = A_1 + A_2$; $A_3 = ASN[SIN(A_7)/N_1]$; $A_4 = A_3 - A_2$; $A_5 = ATN \{SIN(A_4)/[ N_1 - COS(A_4)]\}$; and $A_6 = A_4 + A_5$.

In the practical application of these formulas, rough limits $L_4$ and $L_5$ are set up for computer usage which in turn sets up rough limits that confine the point $K_1$ as far as X values are concerned. This locates the limits that the X value of $K_1$ must fall within, in relation to the X-Y axis intersection located tangent to the back spherical radius. Then the computer is made to refine the calculated curve by use of the fine limits $L_1$ and $L_2$ which tie down the X value of point $K_1$ to any degree of precision desired.

It is understood that for any particular computer run, other variable parameters such as $R_1$, $F_1$, $N_1$, $T_1$ are given numerical values. This process of calculation of aspheric curves allows one to choose an $N_1$ (Index of Refraction) of a commercially available glass for the design of aspheric lens with a high degree of accuracy that can be mass produced from conventional glasses.

By utilizing conventional computer techniques and selecting an X dimension with sufficient significant numbers it is, therefore, possible to quickly obtain an unusually high degree of accuracy of for example $10^{-8}$ with respect to the emitted rays of light being parallel to the optical axis. It is even possible through computer techniques with the inventive manner of forming the aspheric curvature to obtain a degree of accuracy as fine as $10^{-15}$.

While the lens illustrated in FIGS. 1-2 is highly satisfactory for producing the desired concentrated rays of light, the parent application points out a further development which is particularly adapted for use in a vehicle headlight system by creating an auxiliary less concentrated light spread. This auxiliary light spread is, in general, created by the inclusion of parallel flutes on the back surface. Each flute has a cross-section in the form of a spherical segment.

Figure 3:
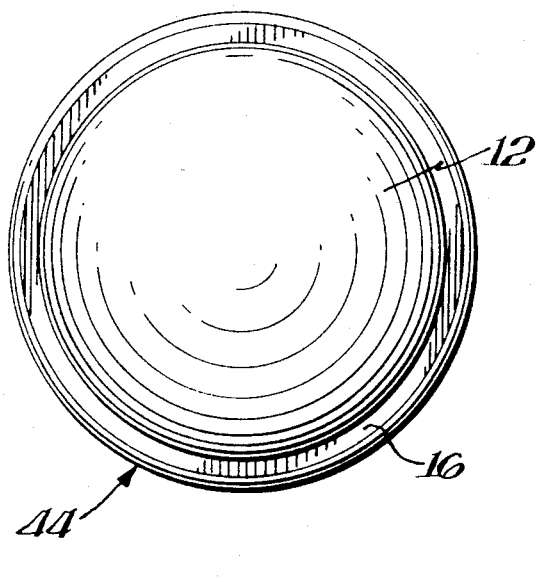
FIGS. 3–4 are front and rear elevation views of a fluted plano-aspheric lens of the type described in the parent application.
Figure 4:
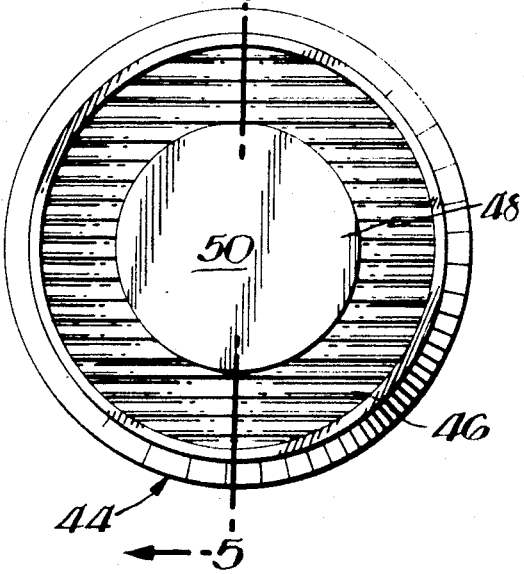
Figure 5:
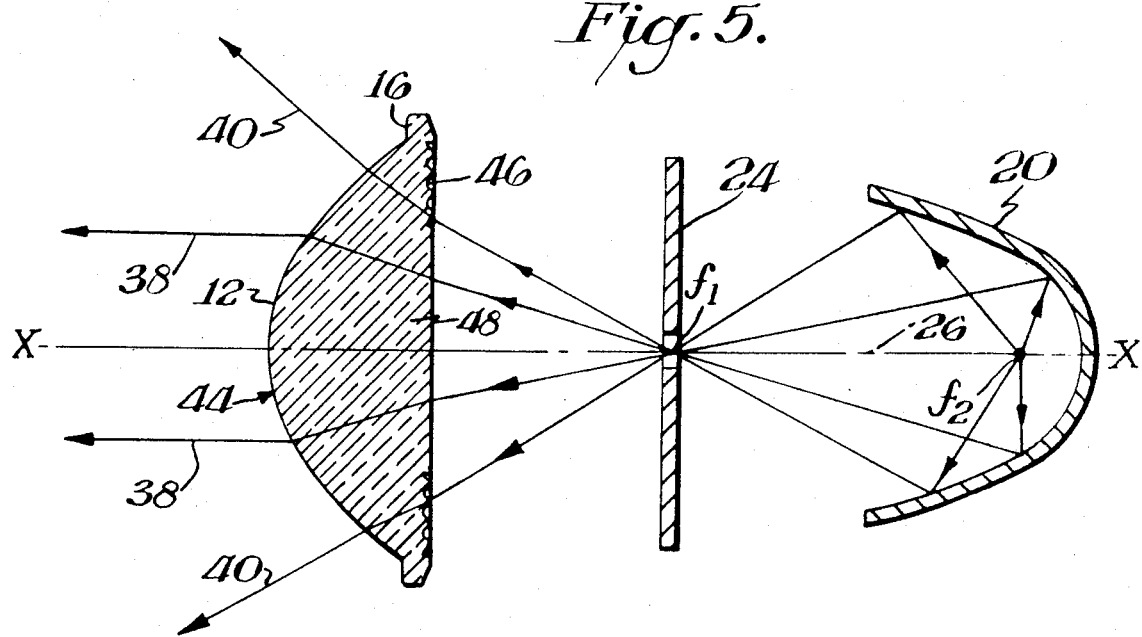
FIG. 5 is a cross-sectional view taken through FIG. 4 along the line 5—5 and showing the ray trace thereof.

FIGS. 3-5 illustrate one form of modified lens. As described in the parent application, this lens is a plano-aspheric lens 44 having an aspheric curvature on its frontal surface 12 and a plano back surface 48 with a plurality of parallel flutes 46. The planar surface includes a circular area 50 which is free of flutes and which lies on the optical axis 26. The resultant ray trace is illustrated in FIG. 5. As illustrated therein concentrated rays of light 38 are produced substantially parallel to the optical axis 26 to thus provide the primary means of light. The provision of flutes 46 create spread light as indicated by the rays 40 which are desirable to permit peripheral lighting for the driver.

Figure 6:
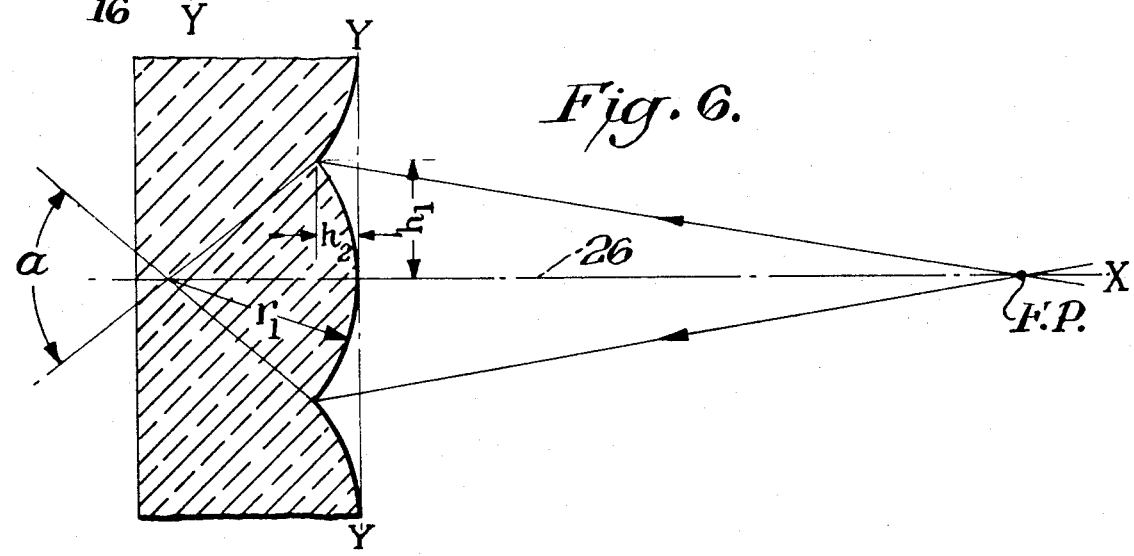
FIG. 6 is a schematic illustration of the parameters used for calculating the flute spread in accordance with this invention.

FIG. 6 illustrates the manner of computing the flute spread. Since the intensity of the light beam is not as critical with the spread light, it is assumed that each flute is symetrically arranged with respect to the optical axis 26 having its focal point FP lying an the X—X axis of an X-Y coordinate system. The Y—Y axis is disposed tangential to the flute outer surface at the intersection of the optical axis and the back surface thereof. The half heighth of a flute is designated as $h_1$ while the heighth of cord or maximum distance the flute extends into the lens is designated as $h_2$. Each flute has a cross section which is the segment of a sphere having a radius indicated as $r_1$. The angle in degrees of spread is designated in FIG. 6 as "a." The flute spread may then be calculated as $r_1 = h_1/SIN(A_4)$ and $h_2 = \{r_1 - 0.5 \sqrt{[4(r_1)^2 - (2h_1)^2]}\}$ wherein $a_1 = a \pi/360$; $a_2 = ASN[SIN(a_1)/N_1]$; $a_3 = ATN \{SIN(a_2)/[N_1 - COS (a_2)]\}$; $a_4 = a_2 + a_3$; and $N_1$ = the index of refraction. With the above defined relationship the flutes are formed to provide any specified amount and angular spread of the spread light. The parameters that may be varied include the indicies of refraction, thickness of lens, diameter of lens, focal distance from FP to the back surface of lens, amount of spread light desired, angular spread desired and width of flutes.

Figure 7:
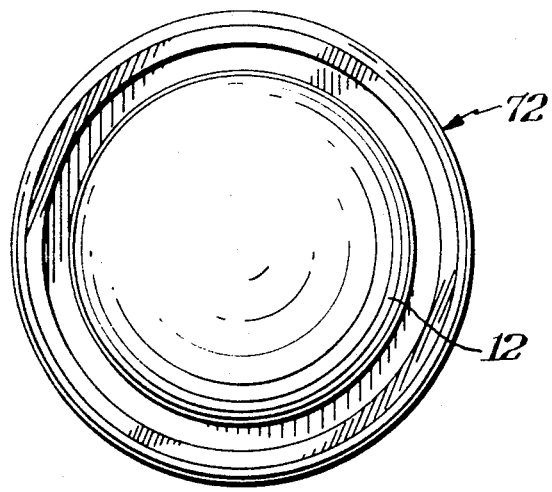
FIGS. 7–8 are front and rear elevation views of a fluted plano-aspheric lens in accordance with this invention.
Figure 8:
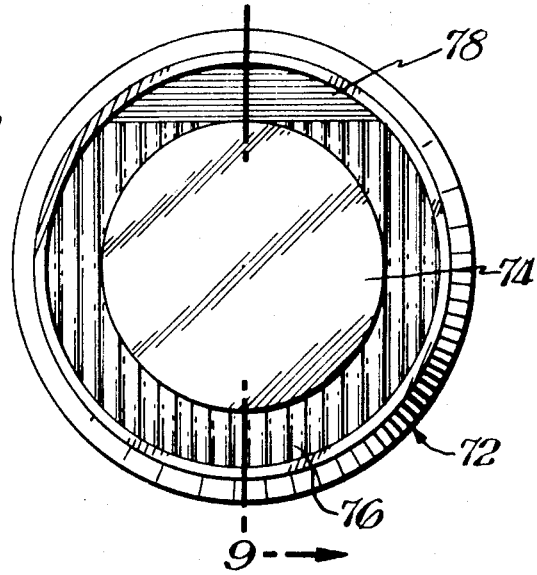
Figure 9:
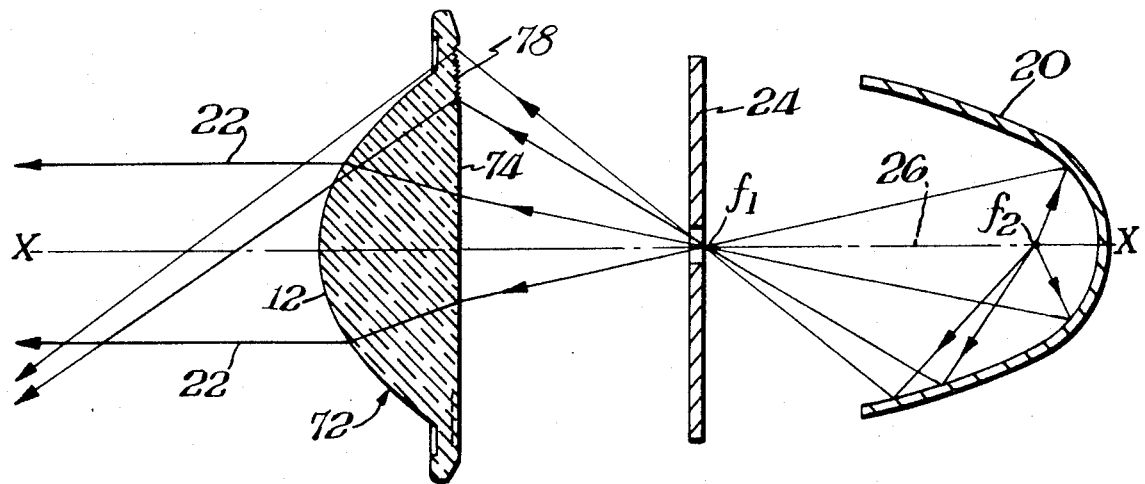
FIG. 9 is a cross-sectional view taken through FIG. 8 along the line 9—9 and showing a ray trace thereof.

FIGS. 7-9 show a further aspheric lens 72 which is formed in accordance with this invention. As indicated therein the lens 72, however, includes provision to create a convergent spread light at the upper portion of the lens so that the spread light will not shine into the eyes of the oncoming driver. Thus the planar surface 74 includes two types of flutes. One type of flute is the parallel spherical segmental flute 76 which creates a divergent spread light. At the uppermost portion of the planar back surface, however, fresnel type parallel flutes 78 are provided. Unlike conventional fresnel lenses, the flutes 78 form in cross section, portions of a continuous aspheric curvature, rather than the conventional spherical curvature or prism type lens. This aspheric curvature would be formed in accordance with the manner of computing the aspheric curvature described in connection with FIG. 2.

Figure 10:
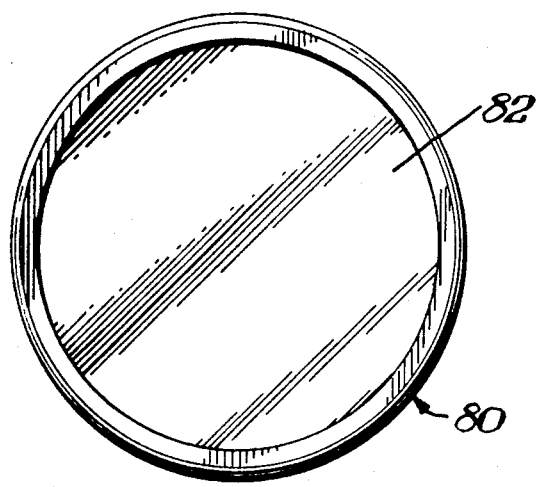
FIGS. 10–11 are front and rear elevation views of a further form of aspheric lens in accordance with this invention.
Figure 11:
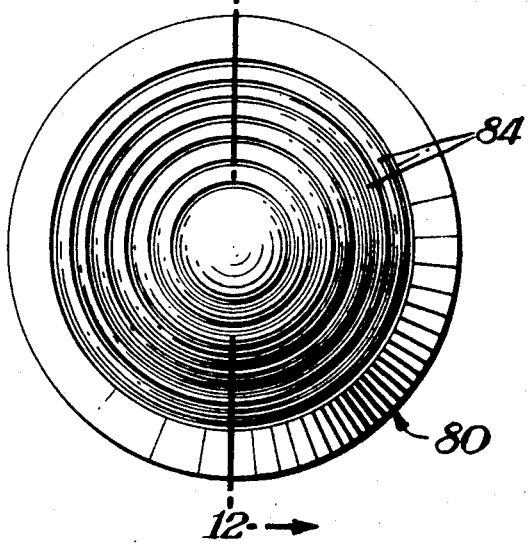
Figure 12:
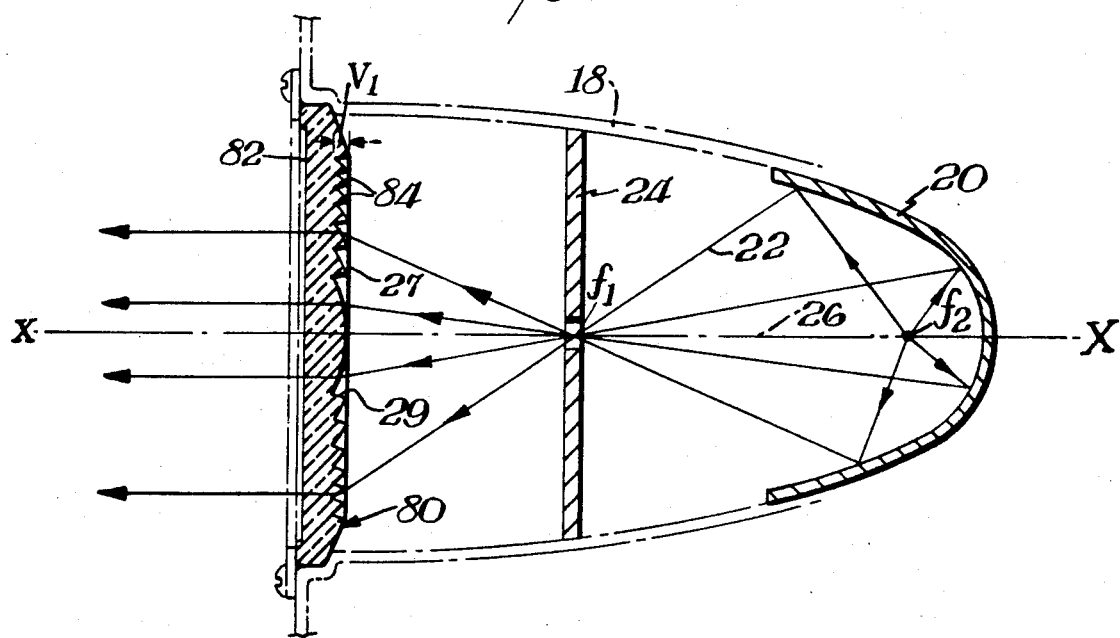
FIG. 12 is a cross-sectional view taken through FIG. 11 along the line 12—12 and showing the ray trace thereof.

FIGS. 10-12 show another form of this invention which is particularly meritorious. The lens 80 illustrated therein represents a significant departure from exiting practices with both fresnel lenses, per se, and with aspheric lenses. In this respect conventional fresnel lenses incorporate the curvature on the frontal surface while the back surface is planar. In such conventional fresnel lenses the curvature is constructed in the form of spherical steps or risers with the index of refraction of the outside environment being taken into account when forming the curvature to produce to desired ray trace. When the outside environment (and thus also its index of refraction) is changed, the ray trace is also changed. Accordingly, such conventional lenses are dependent on their environment.

Unlike such conventional lenses the lens 80 includes a planar frontal surface 82 and a fresnel-type back surface 84 wherein the individual segments comprise portions of an aspheric curvature as previously discussed. By forming the fresnel surface 84 at the rear, the light in the sealed housing entering the lens 80 is made parallel to the optical axis within the lens and remains parallel and uniformaly distributed when emerging therefrom since the frontal surface 82 is planar. This embodiment is particularly advantageous since it renders the emerging path of light independent of its environment beyond the frontal surface 82. Lens 80 is thus equally adapted for use underwater, in air or any other environment, regardless of the index of refraction of the outside environment. Lens 80 thus would have particular utility for submarine use, by scuba divers or in swimming pools where it might be desirable to have a high powered concentrated light beam.

As previously noted the aspheric fresnel-type surface 84 is formed as an aspheric curvature of the type described in conjunction with FIG. 2. Thus the fresnel curvature is based upon the fundamental concepts with respect to the convexo-aspheric lens of FIGS. 1-2 and also the plano-aspheric lens of FIGS. 3-5. The aspheric lens surface is calculated in the same manner as previously described with the additional parameter of a vertical riser ($V_1$) which acts as an artificial restraint for restarting or shifting the aspheric curve as later described. Additionally, for computer use the aspheric surface calculations define $X_3$ as the X point on the curve; $Y_3$ as the Y point on the curve and $Y_4$ as the Y increment. Because of the specific construction of lens 80 which includes for example the planar surface 82, the formulas discussed in conjunction with FIG. 2 are simplified into the following formulas: $A_1 = \text{ATN}(H_1/E_1)$, $A_3 = \text{ATN}\{\text{SIN}(A_1)/[N_1 - \text{COS}(A_1)]\}$, $C_1 = \{Y_1[\text{TAN}(A_3)] - H_1[\text{COT}(A_1)]\}\{TAN(A_3) - \text{COT}(A_1)\}$, $B_1 = X_1 + (C_1 - Y_1)[\text{TAN}(A_3)]$, $X_1 = B_1$; and $Y_1 = C_1$.

In the practical application of these formulas the aspheric curvature 84 is calculated beginning at the intersection of the optical axis 26 and the imaginary plane or plane of origin 27 and continues until a limiting depth equal to the vertical riser $V_1$ is reached. The curve then shifts back to the plane of origin 27 and continues until the limiting depth $V_1$ is again reached. This process is repeated until the entire aspheric curvature is formed. Ideally the step or physical shifting from the limiting depth back to the plane of origin 27 should be perpendicular to the plane 27. For manufacturing reasons, however, this step, such as indicated by the reference numeral 29, is made slightly inclined. It has been found that such a deviation from the normal does not introduce any significant inaccuracies.

The method of forming the aspheric curvature 84 wherein the curvature extends to a limiting depth and then shifts back to a plane of origin may also be employed for forming the aspheric curvature 78 of FIGS. 7-9.

What is claimed is:

1. A light transmitting lens comprising a lens body having a frontal surface and a back surface, said back surface being substantially planar, a plurality of parallel flutes formed in a generally circular area on said back surface to diverge the rays of light away from the axis of the lens to thereby create an auxiliary spread light, a fresnel-type curvature being disposed in said circular area at the top edge of the active area of the back surface transverse the direction of said parallel flutes to direct the rays of light downward toward the axis of the lens, said fresnel-type curvature being formed from an aspheric curvature, said aspheric curvature being a smooth curve of constantly changing radius said generally circular area is ring shaped, said frontal surface is non-planar and said frontal surface has an aspheric curvature which is a smooth curve with constantly changing radius.

2. A light transmitting lens for a housing having an open end with a light source in the housing disposed remote from the open end, said lens having mounting means for closing the open end of said housing from its surrounding environment, said lens having a back surface for being disposed within the housing and a frontal surface for being disposed in the environment outside the housing, said frontal surface being planar, the entire active area of said back surface having a fresnel-type curvature with concentric ridges, said fresnel-type curvature being formed from a non-hyperboloid aspheric curvature, and said aspheric curvature being of smooth curve of constantly changing radius with the points on the curve being constantly recalculated in accordance with the focal distance to the face of the back surface, in accordance with the index of refraction of the lens and in accordance with the vertical riser limiting depth to create a uniform concentrated beam of parallel rays.

3. An aspheric lens as set forth in claim 2 in combination with a light source, and said back surface being disposed between said front surface and said light source.

4. An aspheric lens as set forth in claim 3 including a housing having an open end, said lens closing said open end to seal said housing, and said light source being in said housing.

5. In an aspheric lens which produces paths of light parallel to its optical axis from the rays of light passing therethrough with the emitted light being concentrated and haVing minimal chromatic aberration, said lens having a frontal surface and a back surface, at least a portion of said back surface having a fresnel-type aspheric curvature; said frontal surface having an aspheric curvature, said back surface being substantially planar, and a plurality of parallel flutes being formed in a portion of said back surface to provide an auxiliary spread light pattern, said flutes being arranged in a substantially ring shaped area, said fresnel-type curvature being in a portion of said area, and said flutes being disposed substantially normal to said fresnel-type curvature, said aspheric curvature on said frontal surface being defined in the X–Y coordinate system by $B_1$ being equal to $\{X_1[COT(A_6)] + Y_1 - J_1 + D_1[TAN(A_4)]\}/[TAN(A_4) + COT(A_6)]$ and $C_1$ being equal to $J_1 + (B_1 - D_1)[TAN(A_4)]$ wherein $N_1$ is the index of refraction, $H_1$ is the heighth, $X_1$ is the $X$ value of the previous calculated point, $Y_1$ is $Y$ value of the previous calculated point, $F_1$ is the focal distance from the focal point to said back surface, $R_1$ is the radius of the back surface, $G_1 = 4(2R_1F_1 + F_1^2)$, $A_1 = ATN(H_1/F_1)$, $E_1 = 2(R_1+F_1)[COS(A_1)]$, $E_2 = E_1^2 - G_1$, $M_5 = (E_1 - \sqrt{E_2})(0.5)$, $J_1 = M_5[SIN(A_1)]$, $D_1 = (J_1 - H_1)[TAN(A_1)]$, $A_2 = ASN(J_1/R_1)$, $A_7 = A_1 + A_2$, $A_3 = ASN[SIN(A_7)/N_1]$, $A_4 = A_3 - A_2$, $A_5 = ATN\{SIN(A_4)/N_1 - COS(A_4)\}$, $A_6 = A_4 + A_5$, $B_1 = X$ value of point being calculated; and $C_1 = Y$ value of point being calculated.

6. An aspheric lens as set forth in claim 5 wherein saId fresnel-type aspheric curvature is defined in the same manner as said frontal surface aspheric curvature.

7. An aspheric lens as set forth in claim 6 wherein each of said flutes is defined in cross-section by a radius $r_1 = h_1/SIN(a_4)$ and a chord heighth $h_2 = [r_1 - 0.5\sqrt{+(r_1)^2 - (2h_1)^2}]$, wherein $N_1$ is the index of refraction, $h_1$ is the half heighth of the flute, $a$ is the degrees spread, $a_1 = a\pi/360$, $a_2 = ASN[SIN(a_1)/N_1]$, $a_3 = ATN[SIN(a_2)]/[N_1 - COS(a_2)]$, and $a_4 = a_2 + a_3$.

8. In an aspheric lens which produces paths of light parallel to its optical axis from the rays of light passing therethrough with the emitted light being concentrated and having minimal chromatic aberration, said lens having a frontal surface and a back surface, said frontal surface being substantially planar, and a fresnel-type aspheric curvature being formed on the entire active area of said back surface, said fresnel-type aspheric curvature being defined in the X–Y coordinate system by $C_1 = \{Y_1[TAN(A_3)] - H_1[COT(A_1)]\}/[TAN(A_3) - COT(A_1)]$ and $B_1 = X_1 + (C_1 - Y_1)[TAN(A_3)]$ wherein $N_1$ is the index of refraction, $F_1$ is the focal distance to said back surface, $X_1$ is the variable X, $Y_1$ is the variable Y, $H_1$ is the heighth, $K_1$ is the limit of active surface, $A_1 = ATN(H_1/F_1)$, $A_3 = ATN\{[SIN(A_1)/[N_1-COS(A_1)]\}$, $B_1 = X$ value of point being calculated; and $C_1 = Y$ of value of point being calculated.

9. An aspheric lens as set forth in claim 8 wherein said curvature is further defined by $V_1$ which is a vertical riser limiting depth whereby the curvature continues until the $V_1$ depth is reached aNd then shifts to its plane of origin aNd restarts until $V_1$ is again reached until the curve is completed.

* * * * *

PO-1050
(5/69)

UNITED STATES PATENT OFFICE
CERTIFICATE OF CORRECTION

Patent No. 3,743,385            Dated July 3, 1973

Inventor(s) HOWARD A. SCHAEFER

It is certified that error appears in the above-identified patent and that said Letters Patent are hereby corrected as shown below:

Column 3, line 60, "$H_a/$" should be --- $(H_1/$ ---

Column 6, lines 4 and 5 "$(H_1/E_1$" should be --- $(H_1/F_1$ ---

Column 7, line 8, "haVing" should be --- having ---

Column 8, lines 6 and 7, "$0.5 \sqrt{+(r_1)^2}$" should be --- $0.5 \sqrt{4(r_1)^2}$ ---

Column 8, line 10, "ATN[" should be --- ATN{ ---

Column 8, line 10, "$(a_2)]$" should be --- $(a_2)]\}$ ---

Column 8, line 10, "$(a_2)]$" should be --- $(a_2)_3^2$ ---

Column 8, line 31, "aNd" should be --- and ---

Column 8, line 32, "aNd" should be --- and ---

Signed and sealed this 15th day of October 1974.

(SEAL)
Attest:

McCOY M. GIBSON JR.            C. MARSHALL DANN
Attesting Officer               Commissioner of Patents